United States Patent [19]

Inaba et al.

[11] 4,293,447

[45] Oct. 6, 1981

[54] PROCESS FOR REPAIRING PLATE-SHAPED DENITRATING CATALYSTS

[75] Inventors: Hideya Inaba; Kenichi Nagai; Masayoshi Ichiki; Yasumi Kamino; Kazuo Maeda, all of Osaka, Japan

[73] Assignee: Hitachi Shipbuilding & Engineering Co. Ltd., Osaka, Japan

[21] Appl. No.: 129,204

[22] Filed: Mar. 11, 1980

Related U.S. Application Data

[63] Continuation of Ser. No. 927,097, Jul. 24, 1978, abandoned.

[30] Foreign Application Priority Data

Jul. 6, 1978 [JP] Japan .................................. 53-82563

[51] Int. Cl.³ ........................ B01J 21/06; B01J 35/04
[52] U.S. Cl. ............................. 252/461; 252/477 R; 423/213.2; 423/213.5
[58] Field of Search .................. 252/477 R, 432, 435, 252/454, 456, 457, 458, 459, 460, 461, 463, 464, 465, 466 J, 466 PT, 469, 471, 472, 475, 476; 423/213.2, 213.5

[56] References Cited

U.S. PATENT DOCUMENTS

| 3,362,783 | 1/1968 | Leak | 252/477 R |
| 3,554,929 | 1/1971 | Aarons | 252/477 R |
| 3,925,252 | 12/1975 | Yabuta et al. | 252/477 R |
| 4,040,981 | 8/1977 | Inaba et al. | 252/465 X |

Primary Examiner—W. J. Shine
Attorney, Agent, or Firm—Armstrong, Nikaido, Marmelstein & Kubovcik

[57] ABSTRACT

A plate-shaped denitrating catalyst comprising a metal net, a finely divided porous carrier retained on the metal net with a binder and covering the metal net, and an active component supported on the carrier.

3 Claims, 5 Drawing Figures

PROCESS FOR REPAIRING PLATE-SHAPED DENITRATING CATALYSTS

This is a continuation, of application Ser. No. 927,097, filed July 24, 1978, now abandoned.

BACKGROUND OF THE INVENTION

This invention relates to catalysts for use in a reaction in which nitrogen oxides ($NO_x$) in exhaust gases are selectively catalytically reduced with $NH_3$.

Since photochemical smog is attributable to $NO_x$ released from power plants, sintering or firing ovens, various chemical plants, motor vehicles, etc., it has been desired to provide a method of effectively treating such pollutants. Among the processes heretofore proposed for denitrating exhaust gases, the process for catalytically reducing $NO_x$ with $NH_3$ used as a reducing agent is considered advantageous in that the process can be practiced with a relatively small amount of reducing agent because $NH_3$ selectively reacts with $NO_x$ even when the exhaust gas contains more than 1 vol. % of oxygen.

Catalysts already known for use in this process comprise a carrier such as activated alumina, silica-alumina or zeolite and a heavy metal compound supported on the carrier. Such catalysts are generally granular and are used chiefly in the form of a fixed bed which is liable to be clogged up with the dust contained in exhaust gases or which involves a great pressure loss, thus giving rise to the necessity of using a blower of large capacity. These problems can be overcome to some extent by the use of a catalyst of increased particle or grain size, but the cores of catalyst particles will then fail to act effectively, resulting in a reduced efficiency. In view of the problems described, it appears favorable to use catalysts of honeycomb structure in avoiding the clogging of the catalyst layer with dust or the increase of pressure loss.

Power plants and sintering or firing furnaces usually give off large quantities of exhaust gases which require similarly large quantities of catalysts for treatment. Accordingly catalysts of honeycomb structure, if useful for this purpose, must be large-sized and have sufficient strength so as to be placeable into the treating unit free of any damage. Catalysts of honeycomb structure have already been proposed which comprise a honeycomb support of metal, ceramics or like refractory and an active catalytic component deposited on the support. However, a metal material, if used for the honeycomb structure, must be rendered porous over the surface through a cumbersome procedure so as to hold the active component thereon effectively, whereas structures of ceramics must have an increased wall thickness and be fired to sufficient hardness at a high temperature to retain the desired strength. Catalysts of this type therefore require much labor for the preparation of the honeycomb structure serving as a support for the active catalytic component and become inevitably expensive.

SUMMARY OF THE INVENTION

A first object of this invention is to provide a plate-shaped denitrating catalyst which has a small thickness, high strength and large surface area and which is therefore very suitable to make in a honeycomb structure.

A second object of this invention is to provide a plate-shaped denitrating catalyst having an active component supported on a carrier with high strength.

A third object of this invention is to provide a plate-shaped denitrating catalyst which can be produced without firing for reinforcing purposes and which therefore retains high porosity to exhibit enhanced activity.

A fourth object of this invention is to provide a thin plate-shaped denitrating catalyst which achieves a high efficiency.

These objects of the present invention can be fulfilled by plate-shaped denitrating catalysts comprising a metal net, a finely divided porous carrier retained on the metal net with a binder and covering the metal net, and an active component supported on the carrier.

DESCRIPTION OF THE PREFERRED EMBODIMENTS

Figure 1:
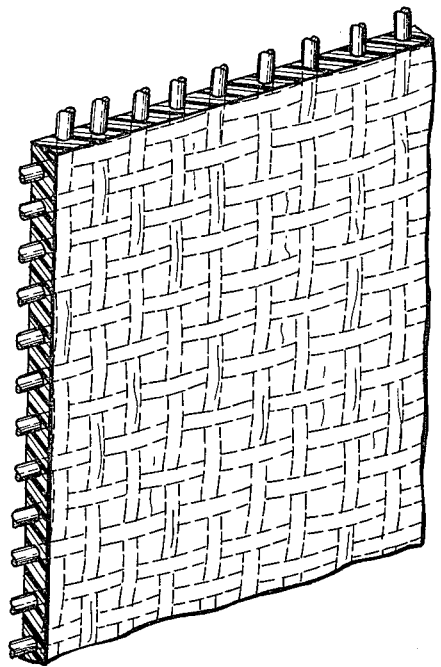
FIG. 1 is a perspective view showing a planar plate-shaped catalyst.

The metal nets useful in this invention may be made of any of carbon steel, stainless steel, copper, brass, etc. The wires forming the nets may have such a diameter that the resulting structure shaped to the desired shape will not be deformed during the production of catalysts or during the use of the catalysts obtained. The net may preferably have small openings although not limitative. Satisfactory results can be achieved with openings of usually about 10- to about 100-mesh size. The net may be in the form of a single planar net, an assembly of superposed planar nets, a wavelike, zigzag, pleated or otherwise shaped net formed by bending or folding a planar net, or a honeycomb structure composed of planar nets and such bent or folded nets in combination therewith. Catalysts of honeycomb structure can be fabricated from the combination of a catalyst formed from a bent or folded metal net and another catalyst formed from a planar metal net. The segments forming such a honeycomb structure may be triangular, square, rectangular, hexagonal or otherwise shaped in accordance with the size of dust particles entrained in exhaust gases and other requirements.

Examples of useful porous carriers are activated alumina, silica, silica-alumina, titania, diatomaceus earth, synthetic zeolite, active carbon, etc.

Examples of preferred binders are $Al(OH)_3$, $Si(OH)_4$, titanates, phosphoric acid, boric acid, etc. which, when dried or baked, will undergo dehydration condensation, giving a tough three-dimensional reticular structure. The porous carrier and the binder are used in the weight ratio of 1:10 to 10:1, preferably about 1:1.

Exemplary of useful active components are V, Cr, Mn, Fe, Co, Ni, Cu, Zn, Mo, Sn, Sb, Bi, W, Pt, Rh, Pd and like metal compounds. These compounds are used singly, or a plurality of them are usable in combination. Further these compounds may be used conjointly with a P compound, B compound, alkaline earth metal compound or the like. Examples of above-mentioned compounds are oxides, acid oxide salts, nitrates, sulfates, halides, hydroxides, organic acid salts, organic acid esters, alcoholates, etc. The kind and amount of the active component to be supported on the carrier are determined in accordance with the temperature, composition and the like of the exhaust gas to be treated. The carrier is caused to support the active component thereon in the usual manner as by immersion. The catalyst may preferably have a small thickness which is usually 0.5 to 2.0 mm.

The catalysts of this invention are produced, for example, by:

(a) applying a slurry composed of a finely divided porous carrier and a binder to a metal net, drying the coated net, baking the resulting mass when so desired and causing the carrier to support an active component;

(b) applying a slurry of a binder and a finely divided porous carrier having an active component supported thereon to a metal net, drying the coated net and, when desired, baking the resulting product;

(c) applying to a metal net a liquid mixture of a carrier material, an active component material and a binder, drying the coated net and, when desired, baking the dry product; or (d) immersing a metal net in a coating bath containing a carrier material and a binder, drying the coated net, baking the dry product when so desired, and causing the carrier coating on the net to support an active component.

A substance, such as an organic solvent, emulsion of high molecular weight substance or carbon fiber, which will be evaporated off, decomposed or burned when dried or baked may be added to the binder to promote the drying of the slurry coating and give increased porosity to the plate formed in the above processes (a) and (b), or to render the active component more dispersible in the process (c). The drying and baking steps in the processes (a) to (d) are practiced under conditions usual in the art. Preferably the wet coated net is dried at 70° to 120° C. for 0.5 to 2 hours and baked at 200° to 500° C. for one to 5 hours.

EXAMPLE 1 a. Preparation of catalysts

A commercial titania powder (100 parts by weight), up to 44μ in particle size and 150 m²/g in surface area, was thoroughly mixed with 100 parts by weight of commercial colloidal silica containing about 20 wt. % of $SiO_2$ to prepare a slurry. The slurry was applied to opposite sides of a 18-mesh metal net 1 as shown in FIG. 1, the net measuring 30 mm × 50 mm and being made from wires of steel (SUS 304, JIS) 0.5 mm in diameter. The coated net was dried at 100° C. for one hour and then baked at 400° C. for 3 hours. In this way, the carrier was held to the metal net in the form of a plate about 0.8 mm in thickness. Subsequently the coated net was immersed in a 2 N oxalic acid solution of $NH_4VO_3$ (1.0 mole/liter) at room temperature for 30 minutes, then dried at 100° C. for one hour and further baked at about 400° C. for 3 hours, whereby a plate-shaped catalyst 2 incorporating V was obtained.

A catalyst incorporating Mo and a catalyst incorporating Fe were prepared in the same manner as above except that an aqueous solution of $(NH_4)_6Mo_7O_{24}$ (0.1 mole/liter) and an aqueous solution of $Fe_2(SO_4)_3$ (1.0 mole/liter) were used respectively for immersion treatment.

In the same manner as above, a carrier was immersed in a 2 N oxalic acid solution of $(NH_4)_{10}W_{12}O_{41}$ (0.1 mole/liter) and then dried for the support of W thereon. The carrier was thereafter caused to support V by the same V-supporting procedure as above with use of the $NH_4VO_3$ solution to prepare a catalyst incorporating both W and V.

b. Activity test

A reactor tube of the flow type was prepared which had a rectangular parallelepiped portion 50 mm in height and having 5 mm × 35 mm openings at its opposite ends. The V-incorporating catalyst was placed into the parallelepiped portion, and a test exhaust gas of the composition listed in Table 1 was passed through the reactor tube at a temperature of 200° C. and at a flow rate of 1 liter/min. (in standard state).

TABLE 1

| Component of gas | Proportion (vol. %) |
|---|---|
| NO | 0.05 |
| $NH_3$ | 0.05 |
| $CO_2$ | 13.0 |
| $H_2O$ | 10.0 |
| $O_2$ | 3.6 |
| $SO_2$ | 0.025 |
| $N_2$ | Balance |

The denitration efficiency of the catalyst was calculated from the difference between the NO concentration at the inlet of the reactor tube and that at the outlet thereof. Similarly the catalyst was tested for denitration efficiency at reaction temperatures of 250° C., 300° C. and 350° C.

In the same manner as above, the Mo-incorporating catalyst, Fe-incorporating catlyst and W- and V-incorporating catalyst were tested for denitration efficiency at the same temperatures. For comparison, the carrier per se was also tested for denitration efficiency at reaction temperatures of 350° C., 400° C. and 450° C.

The V-incorporating catalyst tested as above was thereafter exposed to air containing 0.25 vol. % of $SO_3$ and 3 vol. % of $H_2O$ and passed through the reactor tube containing the catalyst at a rate of 1 liter/min. (in standard state) for one hour. Subsequently the catalyst was tested for denitration efficiency in the same manner as above at the same temperatures.

All the test results are given in Table 2.

TABLE 2

| Catalyst | Amount of active component supported (g/m²) | Denitration efficiency (%) | | | | | |
|---|---|---|---|---|---|---|---|
| | | 200° C. | 250° C. | 300° C. | 350° C. | 400° C. | 450° C. |
| V-containing catalyst | 2.72, calcd. as V | 48.0 (46.5) | 72.0 (68.1) | 84 (80.5) | 91.5 (92.0) | | |
| Mo-containing catalyst | 4.2, calcd. as Mo | 18.8 | 41.5 | 64.2 | 82.1 | | |
| Fe-containing catalyst | 23.3, calcd. as Fe | 13.2 | 26.6 | 75.1 | 86.6 | | |
| W- and V-containing catalyst | 48.1, calcd. as W 1.97, calcd. as V | 63.1 | 85.5 | 94.2 | 96.0 | | |

TABLE 2-continued

| Catalyst | Amount of active component supported (g/m²) | Denitration efficiency (%) | | | | | |
|---|---|---|---|---|---|---|---|
| | | 200° C. | 250° C. | 300° C. | 350° C. | 400° C. | 450° C. |
| Carrier (comparison) | | | | | 0 | 38.1 | 75.1 |

The amount of the active component is expressed in weight per unit area on both sides of the plate-shaped catalyst.
The value in the parantheses represents the denitration efficiency of the V-containing catalyst after having been treated with $SO_3$-containing air.

Table 2 reveals that the plate-shaped catalysts obtained have high denitrating activity at relatively low temperatures as well as at high temperatures. The V-incorporating catalyst retains high activity even after it has been treated with a high concentration of $SO_3$ and therefore has outstanding resistance to sulfuric acid.

EXAMPLE 2 a. Preparation of catalyst

Figure 2:
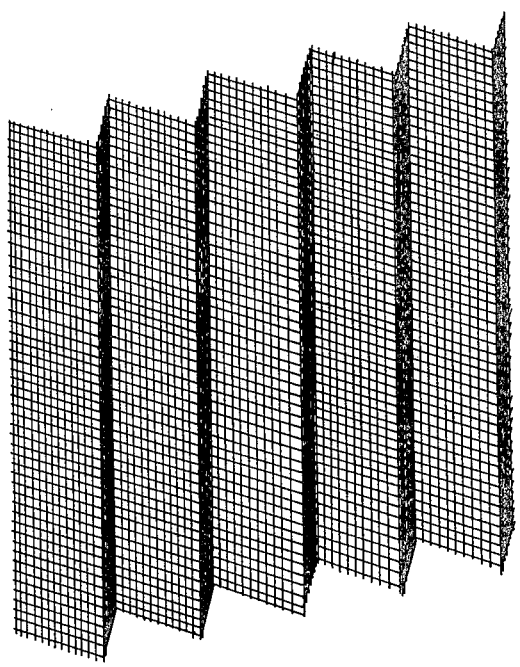
FIG. 2 is a perspective view showing a folded metal net.
Figure 3:
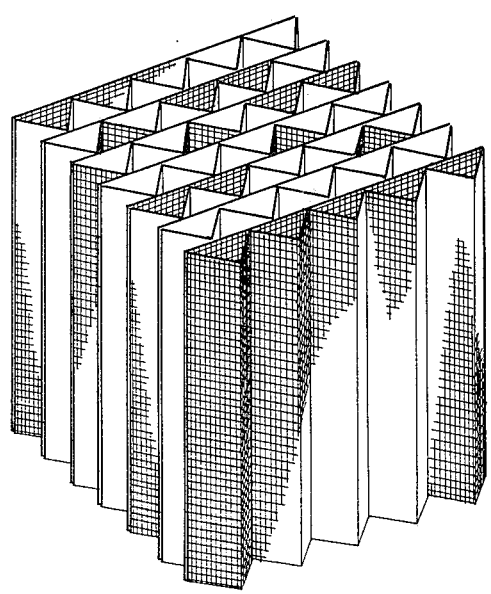
FIG. 3 is a perspective view showing a catalyst of honeycomb structure.

A number of the same metal nets as used in Example 1 (except that they measured 50 mm×100 mm) were folded to a zigzag form as seen in FIG. 2 to prepare folded metal nets 3. A number of the same planar metal nets 1 as used in Example 1 (except that they measured 50 mm×50 mm) were also prepared. Following the same V-supporting procedure as in Example 1, the folded nets 3 and planar nets 1 were caused to support the V compound. The folded pieces of plate-shaped catalyst and planar pieces of plate-shaped catalyst thus obtained were alternately superposed to fabricate a catalyst 4 of cubic honeycomb structure measuring 50 mm in each side and shown in FIG. 3.

b. Activity test

In the same manner as in Example 1, the honeycomb catalyst was tested for denitration efficiency with use of a reactor tube of the flow type having a portion for accommodating the catalyst. The test exhaust gas was passed through the tube at a rate of 155 m³/m² per unit geometric area of the catalyst (in standard state). The results are listed in Table 3.

TABLE 3

| Reaction temperature (°C.) | Denitration efficiency (%) |
|---|---|
| 250 | 76.5 |
| 300 | 88.9 |
| 350 | 96.2 |

Table 3 indicates that the honeycomb catalyst has excellent denitrating activity.

EXAMPLE 3 a. Preparation of catalyst

The same titania powder (100 parts by weight) as used in Example 1 was immersed in a 2 N oxalic acid solution of $NH_4VO_3$ (1.0 mole/liter) at room temperature for 30 minutes, then withdrawn from the solution and dried at 100° C. for one hour. The dry product was in the form of a solid mass and was therefore pulverized. The resulting powder (100 parts by weight) was thoroughly mixed with 100 parts by weight of the same colloidal silica as used in Example 1 to prepare a slurry. The slurry was applied to the same metal net as used in Example 1 over the opposite sides thereof, dried at 100° C. for one hour and thereafter baked at 400° C. for 3 hours, giving a V-incorporating catalyst in the form of a plate. The amount of the V compound supported on the carrier was 31.0 g/m² calculated as V.

b. Activity test

In the same manner as in Example 1, the catalyst was tested for denitration efficiency at varying reaction temperatures. Table 4 shows the results.

TABLE 4

| Reaction temperature (°C.) | Denitration efficiency (%) |
|---|---|
| 200 | 51.1 |
| 250 | 74.2 |
| 350 | 90.8 |

Table 4 shows that the plate-shaped catalyst obtained has high denitration activity.

EXAMPLE 4

A colloidal silica (pH: 3.5) containing 22 wt. % of $SiO_2$, an emulsion of acrylic polymer $-45°$ C. in glass transition temperature and 2000 Å in particle size, ammonium salt of $Ti(OH)_2[OCH(CH_3)COOH]_2$, and a mixture of dibutyltin laurate and the polymer emulsion were mixed together in varying proportions to prepare the four kinds of coating baths A, B, C and D shown in Table 5. Furthermore seven pieces of 100-mesh metal net (size: 30 mm×50 mm; material: SUS 304 steel (JIS); wire diameter: 0.1 mm) were prepared. Of the seven pieces of net, two pieces were immersed in the baths A and B respectively, two into the bath C and three into the bath D. The net pieces were thereafter withdrawn from the baths and dried at 90° C. for one hour. The immersion-drying procedure was repeated three times, forming a 7- to 10-μ-thick porous silica coating on the surface of each piece. The pieces of net were subsequently baked in air at 600° C. for one hour to remove the organic polymer component. In this way, the carrier coatings were held to the net pieces.

The carriers were caused to support $TiO_2$ and/or $V_2O_5$. For the support of $TiO_2$, the carrier was immersed in liquid tetraisopropyl titanate for 10 minutes, withdrawn therefrom, then allowed to stand in saturated water vapor at room temperature for 12 hours to hydrolyze the titanate and thereafter dried at 100° C. For the support of $V_2O_5$, the carrier was immersed in a solution of 1 mole of $NH_4VO_3$ in 1 liter of 15 vol. % aqueous monoethanolamine solution for 10 minutes, withdrawn from the solution and baked in air at 300° C. for one hour. When the carrier was caused to support both $TiO_2$ and $V_2O_5$ thereon, it was made to support $TiO_2$ first. The procedures described above afforded the six kinds of catalysts a, b, c-1, c-2, d-1 and d-2, shown in Table 5. The carrier having neither of $TiO_2$ and $V_2O_5$ supported thereon is also listed as catalyst d-3.

TABLE 5

| Bath | Composition of bath (wt. parts) | | | | Metal component supported (wt.pts.) | | Catalyst |
|---|---|---|---|---|---|---|---|
| | SiO$_2$ | TiO$_2$* | SnO$_2$* | Polymer | TiO$_2$ | V$_2$O$_5$ | |
| A | 100 | — | — | — | 2.2 | 5.5 | a |
| B | 82 | — | — | 18 | 2.2 | 5.5 | b |
| C | 57 | 25 | — | 18 | — | 5.5 | c-1 |
| C | 57 | 25 | — | 18 | 2.2 | 5.5 | c-2 |
| D | 57 | 11 | 14 | 18 | — | 5.5 | d-1 |
| D | 57 | 11 | 14 | 18 | 2.2 | 5.5 | d-2 |
| D | 57 | 11 | 14 | 18 | — | — | d-3 (Comparison) |

*Calculated as the proportion of the metal oxide from the proportion of the corresponding organo metalic compound used for the preparation of the bath.

b. Activity test

Figure 4:
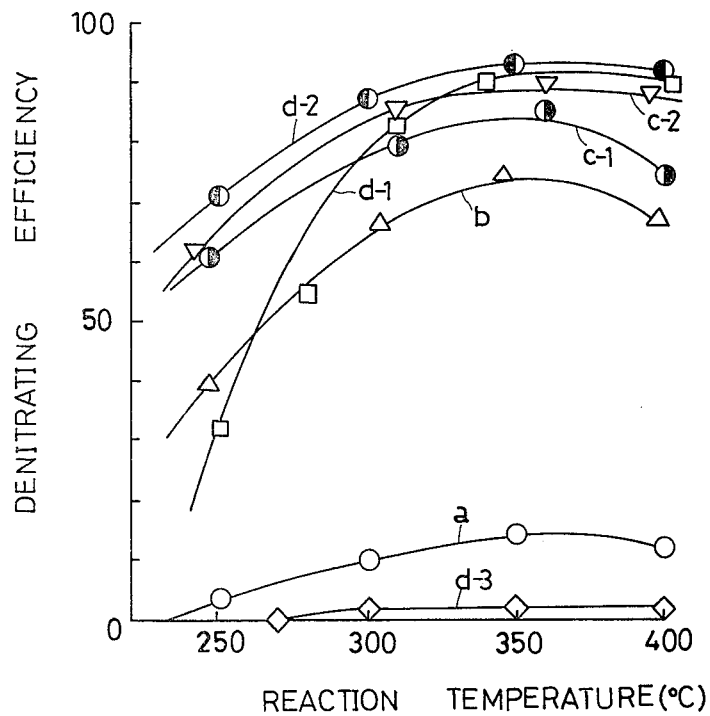
FIGS. 4 and 5 are graphs each showing the relation between the reaction temperature and the denitrating efficiency.
Figure 5:
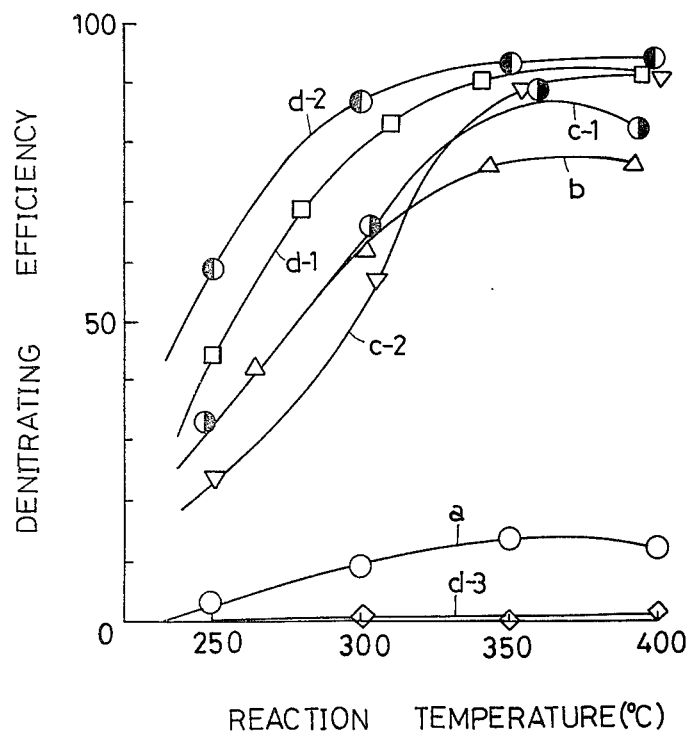

The catalysts were tested for denitration efficiency in the same manner as in Example 1. FIG. 4 shows the results. The catalysts were also treated with air containing SO$_3$ under the same conditions as in Example 1 and thereafter tested for denitration efficiency, with the results given in FIG. 5. FIGS. 4 and 5 reveal that the catalysts have high activity. The catalysts containing SnO$_2$ in the coating have high resistance to sulfuric acid.

What is claimed is:

1. A process for producing a catalyst for reducing nitrogen oxides in exhaust gases comprising the steps of applying a slurry composed of finely divided titania and a binder to a metal net, drying the resulting coating to cause the titania and the binder to be retained on and cover the metal net, immersing the coated net in a solution of a salt of an active component, and drying and baking the immersed body.

2. A process for producing a catalyst for reducing nitrogen oxides in exhaust gases comprising the steps of applying a slurry composed of a binder and finely divided titania having an active component supported thereon to a metal net, drying the resulting coating to cause the titania having the active component supported thereon and the binder to be retained on and cover the metal net and baking the resulting mass.

3. A process for producing a catalyst for reducing nitrogen oxides in exhaust gases comprising immersing a metal net in a coating bath containing titania and a binder, drying the immersed net to form a coating which covers the metal net, immersing the coated net in a solution of a salt of an active component, and drying and baking the immersed body.

* * * * *